United States Patent
Reinhart (10) Patent No.: US 10,316,550 B2
(45) Date of Patent: Jun. 11, 2019

(54) CLOSING ASSEMBLY FOR A LUGGAGE CASE

(71) Applicant: Bayerische Motoren Werke Aktiengesellschaft, Munich (DE)

(72) Inventor: Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 787 days.

(21) Appl. No.: 14/871,164

(22) Filed: Sep. 30, 2015

(65) Prior Publication Data
US 2016/0017642 A1 Jan. 21, 2016

Related U.S. Application Data

(63) Continuation of application No. PCT/EP2014/060422, filed on May 21, 2014.

(30) Foreign Application Priority Data

Jul. 5, 2013 (DE) ........................ 10 2013 213 217

(51) Int. Cl.
*E05B 65/52* (2006.01)
*B62J 9/00* (2006.01)
*E05C 19/00* (2006.01)

(52) U.S. Cl.
CPC ............. *E05B 65/5215* (2013.01); *B62J 9/00* (2013.01); *E05B 65/5246* (2013.01);
(Continued)

(58) Field of Classification Search
CPC .......... Y10S 292/37; B62J 9/00; E05B 65/52; E05B 65/5215; E05B 65/523
(Continued)

(56) References Cited

U.S. PATENT DOCUMENTS 1,965,939 A * 7/1934 Jacobi ................... E05B 83/30
  292/170
2,486,460 A * 11/1949 Bonenberger ...... E05B 65/0003
  292/34

(Continued)

FOREIGN PATENT DOCUMENTS

CN   2337052 Y   9/1999
CN   1296894 A   5/2001
(Continued)

OTHER PUBLICATIONS

Chinese Office Action issued in counterpart Chinese Application No. 201480028609.8 dated Jun. 21, 2017 with English translation (14 pages).

(Continued)

*Primary Examiner* — Carlos Lugo
(74) *Attorney, Agent, or Firm* — Crowell & Moring LLP (57) ABSTRACT

A closing assembly is provided for a luggage case, particularly a top case for a motorized two-wheeled vehicle, which can be mounted on a support. The closing assembly has at least one base plate and a lock mechanism, which is mounted on the base plate and has at least a first and a second movable bolt structure. One of the bolt structures can be coupled to a cover of the luggage case, while the other bolt structure can be coupled to a mounting of the luggage case on the support. The first bolt structure is locked and unlocked by a push function and the second bolt structure is locked and unlocked by a rotary function of the lock mechanism.

14 Claims, 5 Drawing Sheets

(52) U.S. Cl.
CPC .............. *E05C 19/00* (2013.01); *E05B 65/52* (2013.01); *Y10S 292/37* (2013.01)

(58) Field of Classification Search
USPC ......... 292/3–6, 37, 56, 57, 58, 60, 109, 156, 292/157, 159, 162; 70/69–75, 360, 361; 224/435; 296/24.34
See application file for complete search history.

(56) References Cited

U.S. PATENT DOCUMENTS

| | | | | |
|---|---|---|---|---|
| 2,573,061 | A * | 10/1951 | Raymond | E05B 83/30 292/DIG. 37 |
| 3,782,139 | A * | 1/1974 | Rubner | E05C 1/16 292/169 |
| 3,919,866 | A * | 11/1975 | Lipschutz | E05B 17/04 292/170 |
| 4,470,276 | A * | 9/1984 | Bayless | E05C 7/02 292/37 |
| 5,657,652 | A * | 8/1997 | Martin | E05B 55/12 70/107 |
| 5,722,275 | A * | 3/1998 | Price | E05B 13/105 70/360 |
| 6,343,816 | B1 * | 2/2002 | King | E05B 63/22 292/165 |
| 6,481,605 | B1 | 11/2002 | Visenzi | |
| 6,575,503 | B1 * | 6/2003 | Johansson | E05B 5/003 292/170 |
| 6,631,835 | B2 * | 10/2003 | Fang | B62J 9/001 224/315 |
| 7,441,813 | B2 * | 10/2008 | Qin | H04B 1/3883 292/163 |
| 7,695,031 | B2 * | 4/2010 | Jackson, Jr. | E05B 1/0038 292/169 |
| 8,084,701 | B1 | 12/2011 | Misner | |
| 8,191,935 | B2 * | 6/2012 | Toppani | B60R 7/06 292/32 |
| 8,919,158 | B2 * | 12/2014 | Visenzi | B62J 9/00 224/418 |
| 2012/0000950 | A1 | 1/2012 | Reinhart | |

FOREIGN PATENT DOCUMENTS

| | | | |
|---|---|---|---|
| CN | 1314279 A | 9/2001 | |
| EP | 0709282 A1 * | 5/1996 | ............... B62J 9/00 |
| EP | 1 065 139 A1 | 1/2001 | |
| EP | 0 021 228 B1 | 11/2009 | |
| EP | 2 015 982 B1 | 5/2011 | |
| EP | 2 500 246 A1 | 9/2012 | |
| WO | WO 0112496 * | 2/2001 | |
| WO | WO 2007/131954 A1 | 11/2007 | |
| WO | WO 2009/101470 A1 | 8/2009 | |
| WO | WO 2010/130327 A1 | 11/2010 | |

OTHER PUBLICATIONS

International Search Report (PCT/ISA/210) issued in PCT Application No. PCT/EP2014/060422 dated Sep. 9, 2014 with English translation (seven pages).
German Search Report issued in counterpart German Application No. 10 2013 213 217.4 dated Jun. 10, 2014 with partial English translation (11 pages).

* cited by examiner

CLOSING ASSEMBLY FOR A LUGGAGE CASE

CROSS REFERENCE TO RELATED APPLICATIONS

This application is a continuation of PCT International Application No. PCT/EP2014/060422, filed May 21, 2014, which claims priority under 35 U.S.C. § 119 from German Patent Application No. 10 2013 213 217.4, filed Jul. 5, 2013, the entire disclosures of which are herein expressly incorporated by reference.

BACKGROUND AND SUMMARY OF THE INVENTION

The invention relates to a closing assembly for a luggage case which is fastenable on a mounting, in particular a top case for a motorized two-wheeled vehicle.

Luggage cases which are placed onto a mounting, for example a luggage rack, which is attached to the two-wheeled vehicle, and are secured thereon so as to be upright, are referred to as top cases.

Luggage cases usually have a plurality of closing mechanisms. A lid which may provide access to the interior of the case is lockable, on the one hand. On the other hand, a bolting mechanism which secures the luggage case on the mounting is provided. Finally, a lock having a lock cylinder is usually provided, so as to be able to lock the lid and often also the fastener on the mounting.

It is an object of the invention to provide a universally employable closing assembly which, as far as possible, comprises all closing and locking functions of a luggage case in a small package.

This is achieved by a closing assembly for a luggage case which is fastenable on a mounting. The closing assembly has at least one base plate and a lock mechanism which is fastened to the base plate and which includes at least one first and one second adjustable bolt structure. One of the bolt structures is coupleable to a lid of the luggage case, while the other of the bolt structures is coupleable to a fastener of the luggage case. Bolting and unbolting of the first bolt structure is performed by a push function, and bolting and unbolting of the second bolt structure is performed by a rotary function of the lock mechanism. On account of the various types of activation, namely of a rotary movement and linear displacement, various bolt structures may be disposed in a tight space but nevertheless be moved independently from one another. Coupling to the lid of the luggage case and to the fastener of the luggage case on the mounting offers the possibility of readily implementing complete blocking (that is to say a locked state, which is modifiable only by means of a key) as well as temporarily locked states, which may be released by moving operating elements which are independent of the key. The entire closing assembly may thus perform all required closing functions and, at the same time, be designed so as to be compact and universally employable.

The invention is particularly suited to a top case for a motorized two-wheeled vehicle, such as a motorcycle, but is also implementable for laterally fastened luggage cases, for example.

In this context, a "rotary function" is understood to be activation by rotating a component, that is to say by a rotating movement, while a "push function" refers to activation by depressing or extricating a component, that is to say by a linear movement.

The lock mechanism may already include the lock cylinder. However, the lock cylinder may also be separately inserted into the lock mechanism, such that individual and prefabricated lock cylinders may be used for luggage cases of different makes, for example. However, the movement, which is transmitted by the key in the lock cylinder, is preferably always a rotary movement.

Advantageously, both bolt structures are biased toward their bolted positions, since it is most often desirable for the luggage case not to remain on the mounting with the lid being open or unbolted.

Preferably, the closing assembly includes at least three operating elements, in particular a carrying handle for lifting the luggage case off the luggage rack, a lid handle for opening a lid of the luggage case, and a push button for unbolting one of the two bolt structures.

In one preferred embodiment, the first bolt structure in the bolted state blocks the lid handle, specifically and preferably lifting of the lid handle. In this way, a lid bolt structure, connected to the lid handle, which keeps the lid closed as long as the lid handle is not lifted remains reliably bolted. The lid handle may be lifted only once the lid handle has been released by the first bolt structure, on account of which the lid bolt structure is unbolted and opening of the lid of the luggage case is enabled.

According to one advantageous embodiment, the second bolt structure blocks the carrying handle. Here too, lifting of the carrying handle is preferably blocked, in particular if and when the carrying handle is connected to a carrying-handle bolt mechanism which effects bolting to and releasing from the mounting. On account of the carrying handle being blocked, releasing of the luggage case from the mounting can then be reliably prevented.

It goes without saying that an embodiment in which coupling of the two bolt structures is reversed, such that the first bolt structure is connected to the carrying handle, and the second bolt structure is connected to the lid handle, is also possible.

In one potential embodiment, the bolt structures are configured so as to be plate-shaped and have projecting bolt hooks which, in the bolted state, engage in corresponding bolt hooks on the carrying handle and on the lid handle and in this way block movement of the carrying handle or the lid handle, respectively.

Preferably, the lock mechanism has a neutral position which corresponds to a completely locked state and in which the first bolt structure is decoupled from the push function. It may be readily ensured in this way that even forcible activation of the push function, for instance by depressing the lock cylinder, does not lead to the first bolt structure being unbolted.

The lock mechanism has, for example, a rotatably disposed control element having an external face which interacts with the first and/or the second bolt structure. Preferably, the control element here is rotatable about the axis of the lock cylinder and is rotated in particular by rotating the key to various angular positions in the lock cylinder.

The control element may have a clearance which in the neutral position is disposed so as to be opposite the first bolt structure such that there is no contact between the control element and the bolt structure. In this way, decoupling of the first bolt structure from the push function may be readily achieved. If and when the control element in the neutral position is displaced in a linear manner, there is no force acting on the first bolt structure, since the latter is located across the entire displacement path preferably in the clearance and thus does not come into contact with the control element.

The external face of the control element has an inclined ramp face, for example, which is displaced in a linear manner when the push function is activated and which interacts with a ramp face on the first bolt structure, so as to displace the bolt structure in a linear manner. Preferably, when the lock cylinder is unlocked from the neutral position, the ramp face is rotated so as to be below the first bolt structure, so as to establish contact between the control element and the first bolt structure.

The control element may have a protrusion which interacts with the second bolt structure when the control element is rotated and displaces the second bolt structure in a linear manner. By way thereof, the rotary function may be readily implemented. When the control element is rotated, for example by rotating the key in the lock cylinder in the locking direction beyond the neutral position, the protrusion is brought into engagement with the second bolt structure, lifts the latter, and thus unbolts the carrying handle.

Preferably, the lock mechanism has a spring which causes the push function and the rotary function to be reset. A helical spring which may encircle the control element is suitable therefor, for example. Axial compression of the helical spring generates a restoring force for the push function, which moves the control element in a linear manner. The restoring force for the rotary function may be readily implemented in that one end of the spring is fastened to the control element while the other end of the helical spring is fastened on the base plate, or when rotated comes into contact with the base plate. In this way, a restoring force in the circumferential direction is generated.

In order for the closing assembly to be designed so as to be compact, the second bolt structure may be guided on the first bolt structure and, in particular, may be biased toward the first bolt structure. In this way, only one fastener and/or guide of one of the bolt structures is required on the base plate, which saves installation space.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
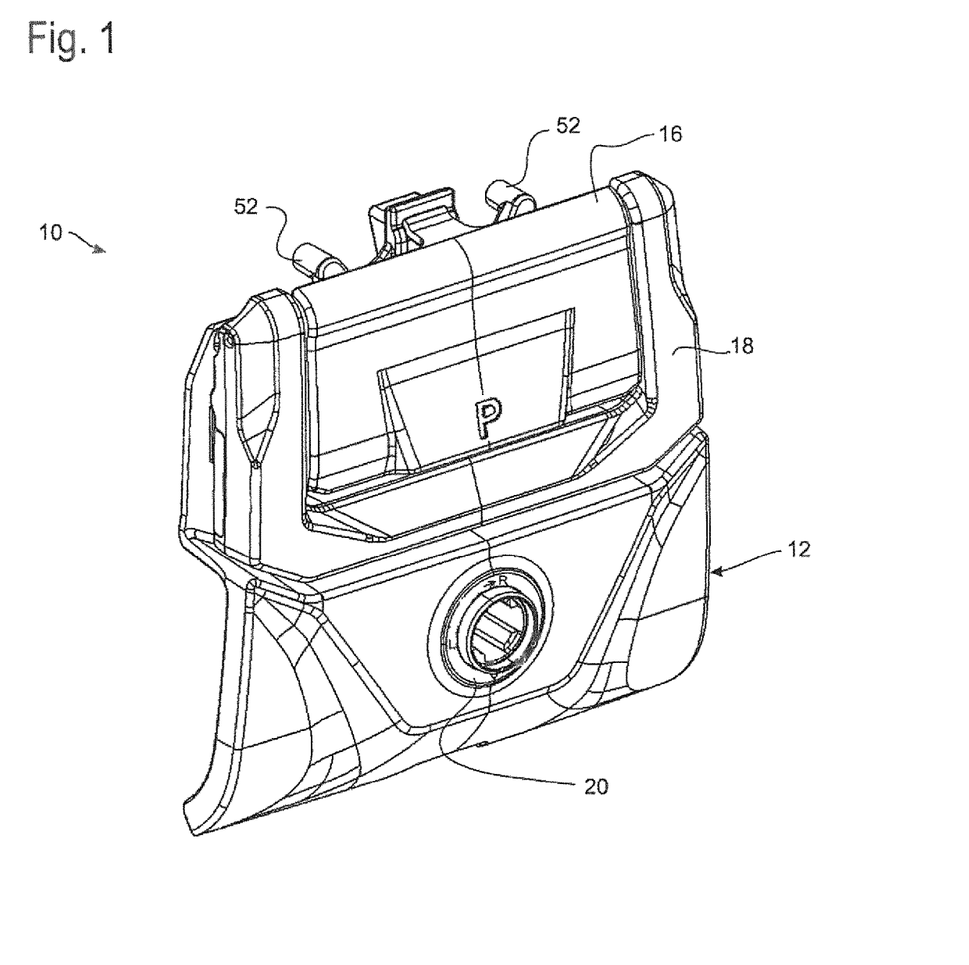
FIG. 1 is a schematic perspective view of the external side of a closing assembly according to an embodiment of the invention.

FIG. 1 shows a closing assembly 10 which is substantially composed of a base plate 12, a lock mechanism 14 which is fitted to the base plate 12 (see FIG. 2), and presently three operating elements 16, 18, 20.

The first operating element 16 here is a lid handle which is coupled to a lid of a luggage case (not illustrated in more detail here).

The second operating element 18 here is a carrying handle which is coupled to a carrying handle mechanism (not illustrated in more detail) for fastening the luggage case on a mounting, for example a luggage rack of a motorized two-wheeled vehicle.

The third operating element 20 is a push button. The push button is formed by an annular element which encircles a lock cylinder (not illustrated) of the lock mechanism 14 and which is connected to a control element 22 (see FIG. 2) (described below) and which may be pushed into the base plate 12. The operating element 20 and the control element 22 in this example form a fixedly connected unit.

Figure 2:
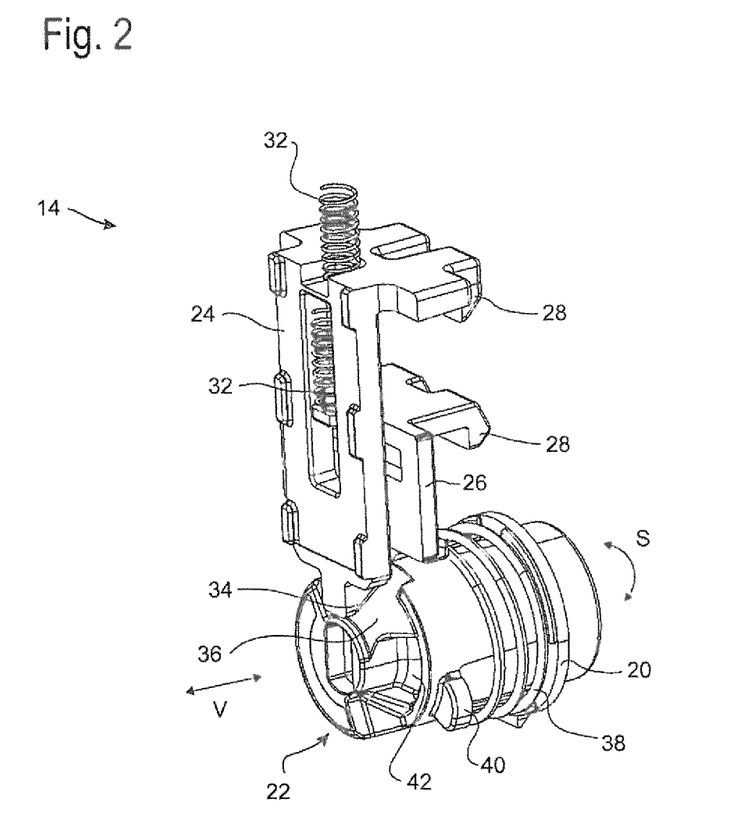
FIG. 2 is a schematic perspective view of a lock mechanism of the closing assembly according to an embodiment of the invention.

The lock mechanism 14 includes a first bolt structure 24 and a second bolt structure 26, which both in the present case are configured by a plate-shaped body having bolt hooks 28 projecting therefrom.

Figure 5:
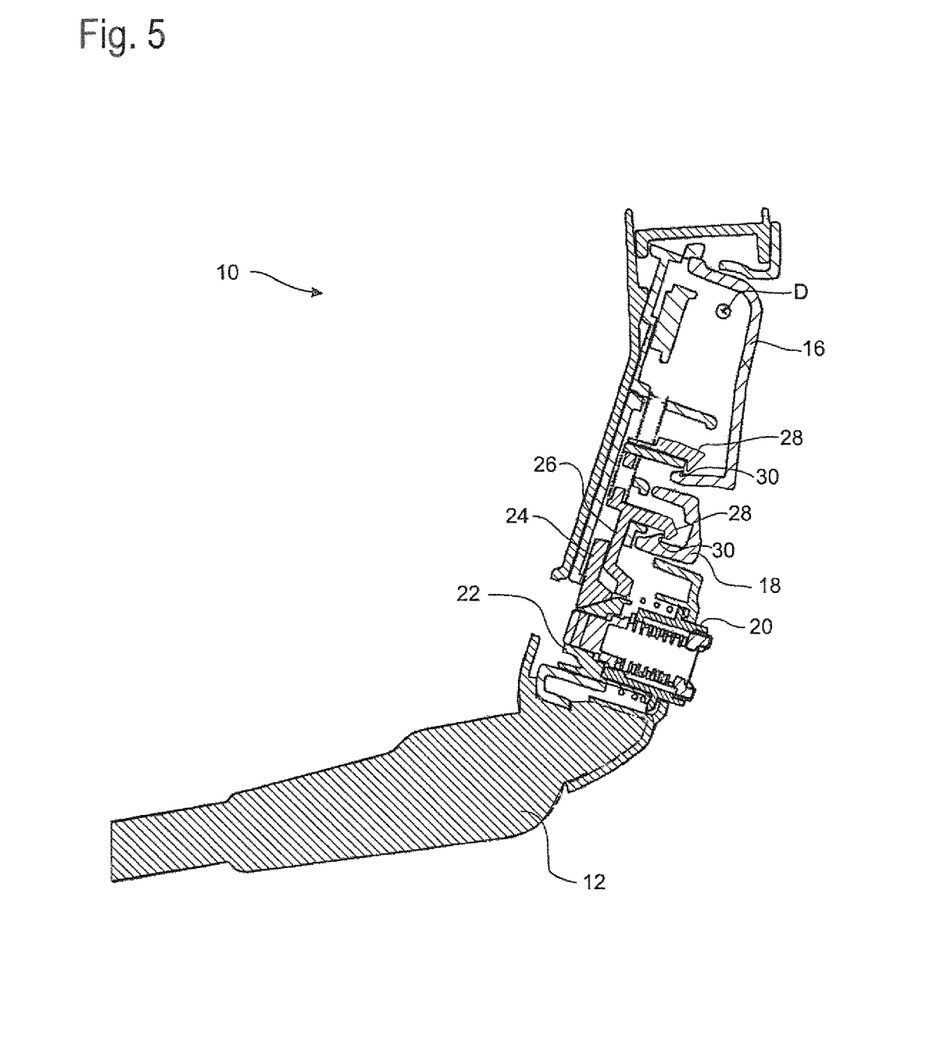
FIG. 5 is a schematic sectional view of a closing assembly according to an embodiment of the invention.

As illustrated in FIGS. 2 and 5, the plate-shaped bodies of the first and of the second bolt structure 24, 26 here are positioned so as to be parallel with one another and behind one another.

The bolt hooks 28 in the bolted state of the respective bolt structure 24, 26 engage in corresponding bolt hooks 30 on the operating elements 16, 18, that is to say the lid handle or the carrying handle, respectively. In this way, lifting of the respective handle is blocked in the bolted state.

Figure 3:
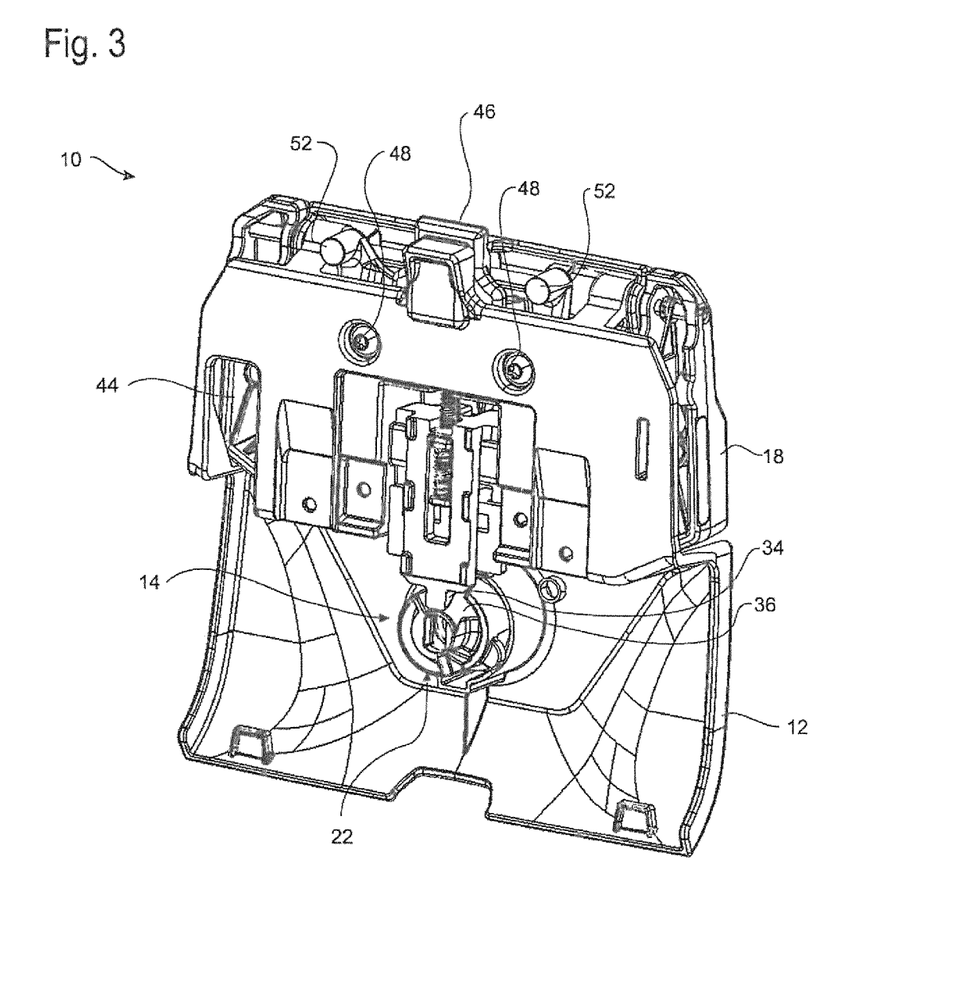
FIG. 3 shows the closing assembly of FIG. 1 from the internal side.

The lock mechanism 14 is inserted into the base plate 12 such that the first bolt structure 24 is displaceably guided in a linear manner on the base plate, as is indicated in FIG. 3.

The second bolt structure 26 here is guided on the first bolt structure 24. A connection to the base plate 12 can be eliminated.

The first as well as the second bolt structure 24, 26 in the bolted position thereof are biased (in a downward manner in the figures) by way of springs 32. The spring 32 which is connected to the first bolt structure 24 here is supported on the base plate 12, while the spring 32, which biases the second bolt structure 26, is disposed in a clearance of the first bolt structure 24 and is supported thereon.

The end of the first bolt structure 24 in the figures which is the lower end has an inclined ramp face 34 which interacts with an identically oriented ramp face 36 on the external face of the control element 22.

If and when the third operating element 20 is pushed into the base plate 12, the ramp face 36 of the control element 22 is displaced (see arrow V in FIG. 2) and thereby lifts the first bolt structure 24. On account thereof, the bolt hooks 28 are disengaged from the bolt hooks 30 on the lid handle 16, so that the lid may now be lifted.

Depressing the operating element 20 and unbolting the first bolt structure 24, which is connected therewith, is also referred to as the push function.

A helical spring 38 which concentrically encircles the control element 22 and the operating element 20 generates a restoring force toward the initial position.

The operating element 20 and the control element 22 have a receptacle in which a lock cylinder (not illustrated here) is anchored. By inserting a matching key into the lock cylinder and rotating said key, the entire control element 22 may be rotated (see arrow S in FIG. 2).

In the figures, the lock mechanism 14 is illustrated in a position in which the first bolt structure 24 is bolted but may be unbolted by depressing the third operating element 20.

The second bolt structure 26 remains bolted even when the push function is activated, and is unbolted only when the control element 22 is rotated. Unbolting the second bolt structure 26 by rotating the control element 22 here is also referred to as the rotary function.

In order for the second bolt structure 26 to be unbolted, a protrusion 40, which externally projects in the radial direction and has a ramp face which interacts with an external face of the second bolt structure 26, is configured on the external circumferential face of the control element 22. If and when the control element 22 is rotated to the right in FIG. 2, the protrusion 40 comes into contact with the second bolt structure 26 and lifts the latter counter to the force of the spring 32. Lifting the second bolt structure 26 has the consequence that the bolt hooks 28 are disengaged from the bolt hooks 30 on the carrying handle, so that the carrying handle may now be lifted.

Moreover, the control element 22 on the external face thereof has a clearance 42 which in the circumferential direction is disposed between the protrusion 40 and the ramp face 36, the clearance 42 and the protrusion 40 partially overlapping in the axial direction. If and when the lock mechanism 14 is in the locked position thereof, the clearance 42 is located directly below the ramp face 36 of the first bolt structure 24. In the figures, this corresponds to a position in which the key is transverse in the lock cylinder and points to the "L" in FIGS. 1 and 4. When the third operating element 20 is depressed in this position, the control element 22 does not come into contact with the first bolt structure 24, since the control element 22 and the first bolt structure 24 are completely decoupled.

It is only when the key is rotated to the vertical position in the figures, which corresponds to an opened state (corresponding to the marking "0" in the figures), that the ramp face 36 lies below the ramp face 34 and that the lid handle may be unbolted, as illustrated in FIG. 2.

If and when the key and thus the control element 22 are rotated from the opened position farther to the right in the figures (indicated by the marking "R" in FIGS. 1 and 4), the protrusion 40 is brought into contact with the second bolt structure 26. Here, the ramp face 34 of the first bolt structure 24 as before is still in the region of the clearance 42.

When the control element 22 is rotated by the key in the lock cylinder, the spring 38 comes, for example, into contact with the base plate 12 (not illustrated), such that a bias counter to the direction of rotation, which generates a restoring force, may be built up.

The lock mechanism 14 is obscured by a cover plate which is screwed to the base plate 12 and which, for reasons of improved visibility, has been omitted in FIG. 3.

The closing assembly 10 may be installed in any arbitrary luggage case, in particular a top case, which has a mechanism for fastening to a mounting, and a mechanism for locking the lid of said case.

The carrying handle, that is to say the second operating element 18, is then connected to the mechanism for fastening to the mounting, for example by a coupling rod, such that lifting of the carrying handle has the consequence of the carrying handle mechanism being released from the mounting. A coupling rod of this type may be routed through a clearance 44 on the rear side of the closing assembly 10, for example.

Figure 4:
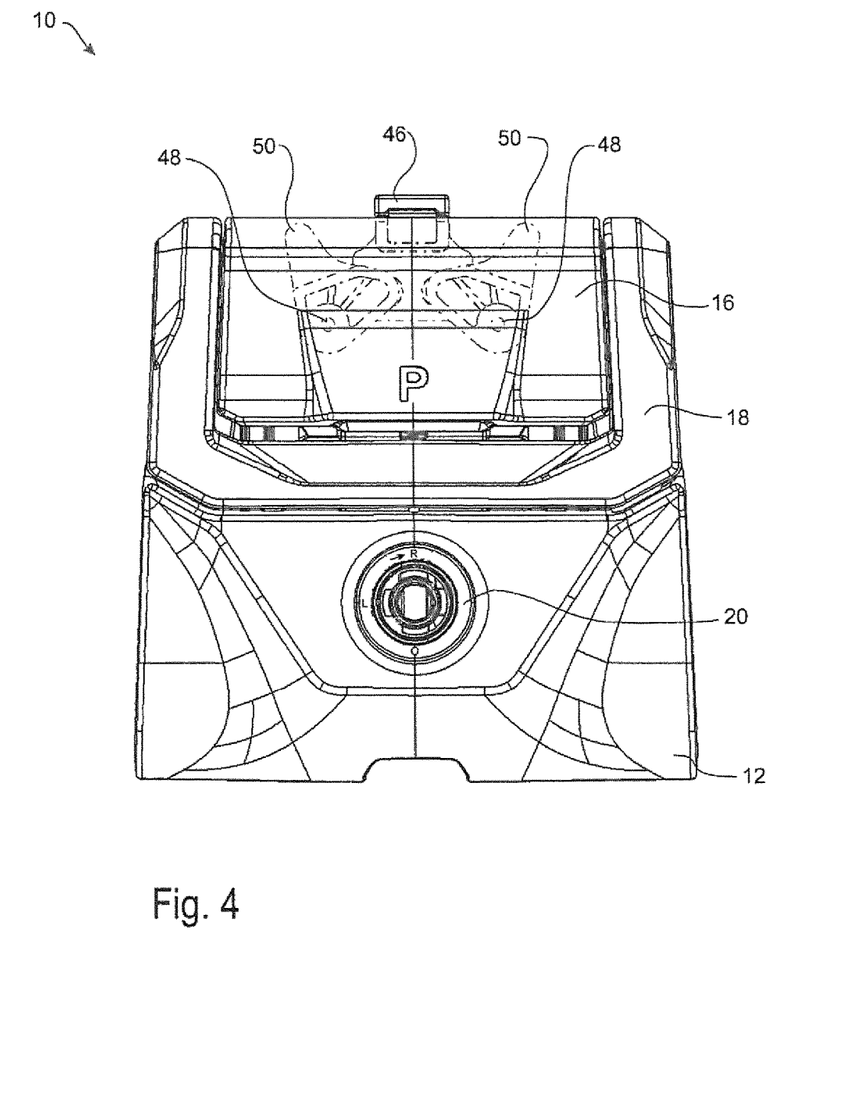
FIG. 4 shows the closing assembly of FIG. 1 from the external side.

The closing assembly 10 in this example also has a mechanism for opening the lid of the luggage case. The mechanism is indicated in FIGS. 3 and 4.

A protrusion 46 is molded on the first operating element 16, the lid handle, presently in the center of that end of the lid handle that in the figures is the upper end. The protrusion 46 is pivoted when the lid handle is lifted about the rotation axis D thereof. This pivoting movement is transmitted to two pivot elements 50, mounted on the base plate 12, which are in each case disposed so as to be lateral in relation to the protrusion 46 and which are pivotable by way of eccentrically disposed pivot points 48. Each of the pivot elements 50 has a pin 52 which is moved when the pivot element 50 is pivoted. Movement in this example is performed such that the two pins 52 are pivoted toward one another. The pins 52 may be coupled to a closure mechanism of the lid (not illustrated) and may retract blocking pins of a lid bolt structure, for example.

Other types of couplings between the operating elements and, in particular, the lid and the mounting are, of course, also contemplated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closing assembly for a luggage case fastenable on a mounting, the closing assembly comprising:
   a baseplate;
   a lock mechanism fastened to the baseplate, wherein the lock mechanism comprises first and second bolt structures, a lock element and a control element, the lock element being configured to be linearly displaced in a lock mechanism release direction along a lock mechanism release axis and configured to be rotated about the lock mechanism release axis to rotate the control element,
   wherein
      one of the first and second bolt structures is coupleable to a lid of the luggage case and another of the first and second bolt structures is coupleable to a fastener of the luggage case on the mounting,
      the one bolt structure coupleable to the lid is configured to be moved, by a push function of the lock element that linearly displaces the control element, from a lid locking position at which the one bolt structure coupleable to the lid prevents opening of the lid to a lid release position at which the lid is openable, and
      the other bolt structure coupleable to the fastener is configured to be moved, by a rotary function of the control element generated by rotation of the lock element from a case locking position at which the one bolt structure coupleable to the fastener prevents release of the case from the mounting to a case release position at which the case is releasable from the mounting,
      the lock element has a neutral position corresponding to a completely locked state in which the first bolt structure is decoupled from the push function, and
      the control element has an external face configured to interact with the first bolt structure when the lock element is linearly displaced and to interact with the second bolt structure when the lock element is rotated about the lock mechanism release axis.

2. The closing assembly according to claim 1, wherein the closing assembly is configured for a top case of a two-wheeled vehicle.

3. The closing assembly according to claim 1, further comprising:
   a first operating element configured as a lid handle for opening the lid of the luggage case; and a second operating element configured as a carrying handle for lifting the luggage case off of a luggage rack, wherein the locking element is a third operating element.

4. The closing assembly according to claim 3, wherein the first bolt structure in a bolted state blocks the first operating element.

5. The closing assembly according to claim 3, wherein the second bolt structure in a bolted state blocks the second operating element.

6. The closing assembly according to claim 1, wherein the control element has a clearance which, when the control element is in a neutral position, is disposed so as to be opposite the first bolt structure such that no contact occurs between the control element and the first bolt structure.

7. The closing assembly according to claim 1, wherein the external face of the control element has an inclined ramp face configured to be displaced in a linear manner when the push function is activated, the inclined ramp face interacting with a ramp face on the first bolt structure so as to displace the first bolt structure in a linear manner.

8. The closing assembly according to claim 6, wherein the external face of the control element has an inclined ramp face configured to be displaced in a linear manner when the push function is activated, the inclined ramp face interacting with a ramp face on the first bolt structure so as to displace the first bolt structure in a linear manner.

9. The closing assembly according to claim 1, wherein the control element has a protrusion configured to interact with the second bolt structure when the control element is rotated, the protrusion being configured to displace the second bolt structure in a linear manner.

10. The closing assembly according to claim 8, wherein the control element has a protrusion configured to interact with the second bolt structure when the control element is rotated, the protrusion being configured to displace the second bolt structure in a linear manner.

11. The closing assembly according to claim 1, wherein the lock mechanism has a spring configured to cause the push function and the rotary function to be reset.

12. The closing assembly according to claim 10, wherein the lock mechanism has a spring configured to cause the push function and the rotary function to be reset.

13. The closing assembly according to claim 1, wherein the second bolt structure is guided by the first bolt structure during movement caused by the control element.

14. The closing assembly according to claim 13, where the second bolt structure is biased by a spring against the first bolt structure.

* * * * *